United States Patent
Karwande

Patent Number: 5,129,193
Date of Patent: Jul. 14, 1992

[54] SEALING SYSTEM FOR MOVABLE DUAL PANE GLASS

[75] Inventor: Vijay V. Karwande, Livonia, Mich.

[73] Assignee: Ford Motor Company, Dearborn, Mich.

[21] Appl. No.: 290,659

[22] Filed: Dec. 27, 1988

[51] Int. Cl.⁵ .............................................. E06B 7/16
[52] U.S. Cl. ..................................... 49/441; 49/374; 49/484
[58] Field of Search ............... 49/376, 377, 502, 352, 49/440, 441, 484, 374; 52/788, 790

[56] References Cited

U.S. PATENT DOCUMENTS

| | | |
|---|---|---|
| 3,434,251 | 3/1969 | Kiehaefer . |
| 3,479,768 | 11/1969 | Smadja . |
| 4,006,569 | 2/1977 | Kain . |
| 4,015,394 | 4/1977 | Kessler . |
| 4,193,605 | 3/1980 | Josephson . |
| 4,261,610 | 4/1981 | Inamoto et al. . |
| 4,314,872 | 2/1982 | Schiesser .................... 49/441 |
| 4,531,335 | 7/1985 | Mangan . |
| 4,608,779 | 9/1986 | Maeda ........................ 49/440 |
| 4,689,916 | 9/1987 | Shimizu ...................... 49/374 |
| 4,744,173 | 5/1988 | Mesnel et al. . |
| 4,744,174 | 5/1988 | Mesnel et al. . |

FOREIGN PATENT DOCUMENTS

| | | |
|---|---|---|
| 0080587 | 6/1983 | European Pat. Off. . |
| 090947 | 10/1983 | European Pat. Off. . |
| 3517581 | 9/1986 | Fed. Rep. of Germany ........ 49/352 |
| 6716713 | 6/1968 | Netherlands ................. 49/440 |

*Primary Examiner*—Gerald A. Anderson
*Attorney, Agent, or Firm*—Daniel M. Stock; Roger L. May

[57] ABSTRACT

A window sealing system for double plane movable automotive windows includes a seal having bulbous portions for compressively engaging peripheral edges of each glass pane sealing lips for engaging non-peripheral surfaces of the panes

4 Claims, 2 Drawing Sheets

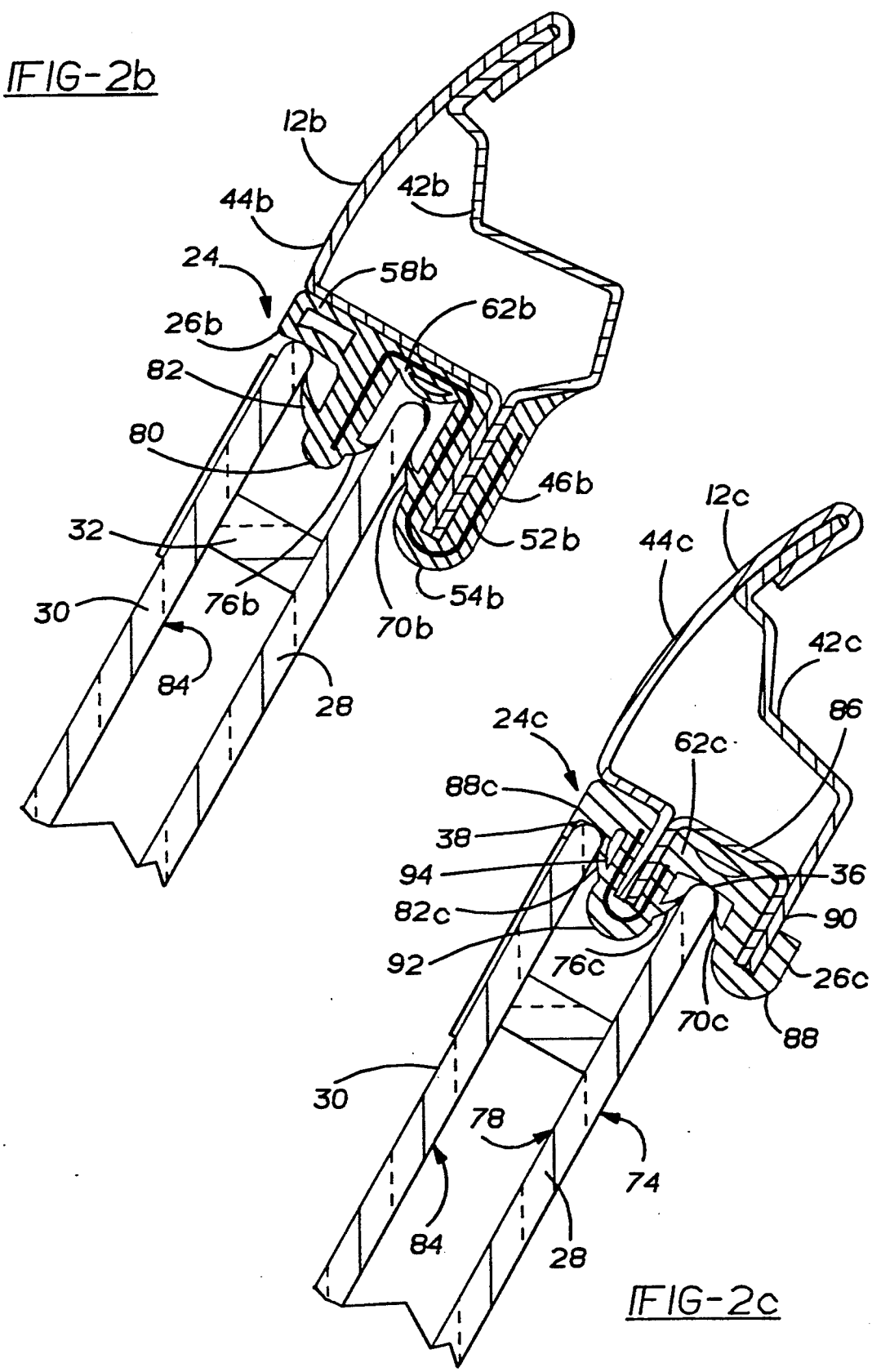

SEALING SYSTEM FOR MOVABLE DUAL PANE GLASS

BACKGROUND OF THE INVENTION

The present invention relates generally to sealing systems for multiple pane windows and more specifically to sealing systems for dual pane windows utilized in movable side glass of automotive vehicles.

The desire of the automotive industry to enhance the aerodynamic efficiency of automobile bodies has resulted in a great deal of attention being given to the design of movable side window systems for automobiles. It has been found desirable to provide for positioning the outer surface of the side windows in their closed positions in substantially coplanar relationship with the adjacent outer surfaces of the vehicle body. While some success has been achieved in defining this coplanar relationship, generally referred to as "flushness," it has been recognized that the lower edge of vertically movable vehicle side windows tend to be more offset from the adjacent vehicle body surfaces than the other edges of the window at the point in which the window is raised upwardly out of the interior of the vehicle door.

One recent response to this perceived deficiency is to provide a dual pane assembly for the side windows of a vehicle which is guided in raising and lowering along a weld flange created in the assembly of inner and outer panels of the door. U.S. Pat. No. 4,744,173 and U.S. Pat. No. 4,744,174 to Mesnel et al. illustrate this assembly. The sealing system proposed for use with this assembly, however, does not provide as effective a seal as is considered desirable. The sealing system exemplified in the patents to Mesnel et al. provides a guide member carried on the joint flange of the door which engages outer peripheral edges of the window panes in lip seal fashion. If the motion of a dual pane side window of an automotive vehicle is not accomplished by direct engagement on the door panel joining flange, as indicated in the exemplary patents to Mesnel et al, such a sealing system would be considerably less effective than that contemplated there since the guiding of the central portion of the seal within the window panes may not effect sliding sealing engagement.

It is accordingly an object of the present invention to provide a sealing system for slidably movable dual pane side windows of automotive vehicles which provides improved extended sealing surfaces between the dual pane window and the automotive vehicle body.

It is another object of the present invention to provide such a sealing system which facilitates stable positioning of the movable dual pane side window within the vehicle body.

SUMMARY OF THE INVENTION

To accomplish these objects a sealing system is provided in which a seal member is carried on a flange formed on the periphery of the vehicle door window aperture and provides bulbous seal portions for engaging the peripheral edges of the window panes and lip seal portions for engaging non-peripheral surfaces of the panes.

The sealing system may be advantageously incorporated into an automotive vehicle door in a manner in which the inner of the two window panes is carried in a secure relationship within a U-channel formed in the door.

BRIEF DESCRIPTION OF THE DRAWINGS

These and other objects and features of the invention will become apparent to those skilled in the automotive body sealing arts upon reading the following description with reference to the accompanying drawings in which like numbers refer to like parts throughout the several view and in which:

FIG. 2b is a view similar to FIG. 2 of an alternative embodiment of the sealing system of FIG. 2a; and FIG. 2c is likewise a view similar to FIG. 2 showing another alternative embodiment of the sealing system of FIG. 2a.

DESCRIPTION OF THE PREFERRED EMBODIMENTS

Figure 1:
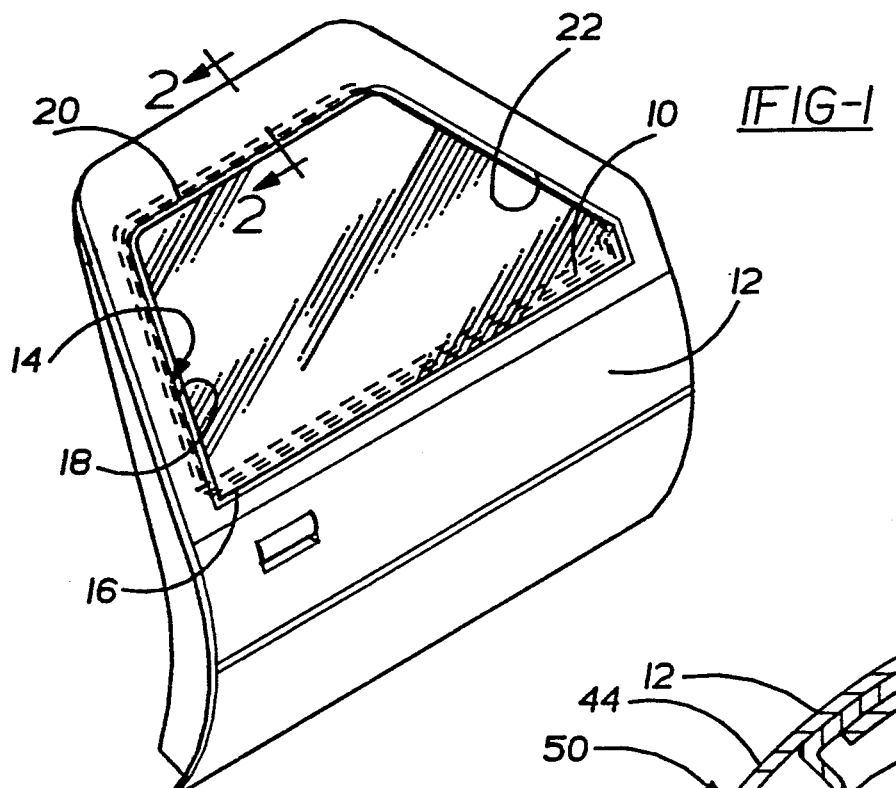
FIG. 1 is a perspective view of a automotive vehicle door having a dual pane movable side window.
Figure 2A:
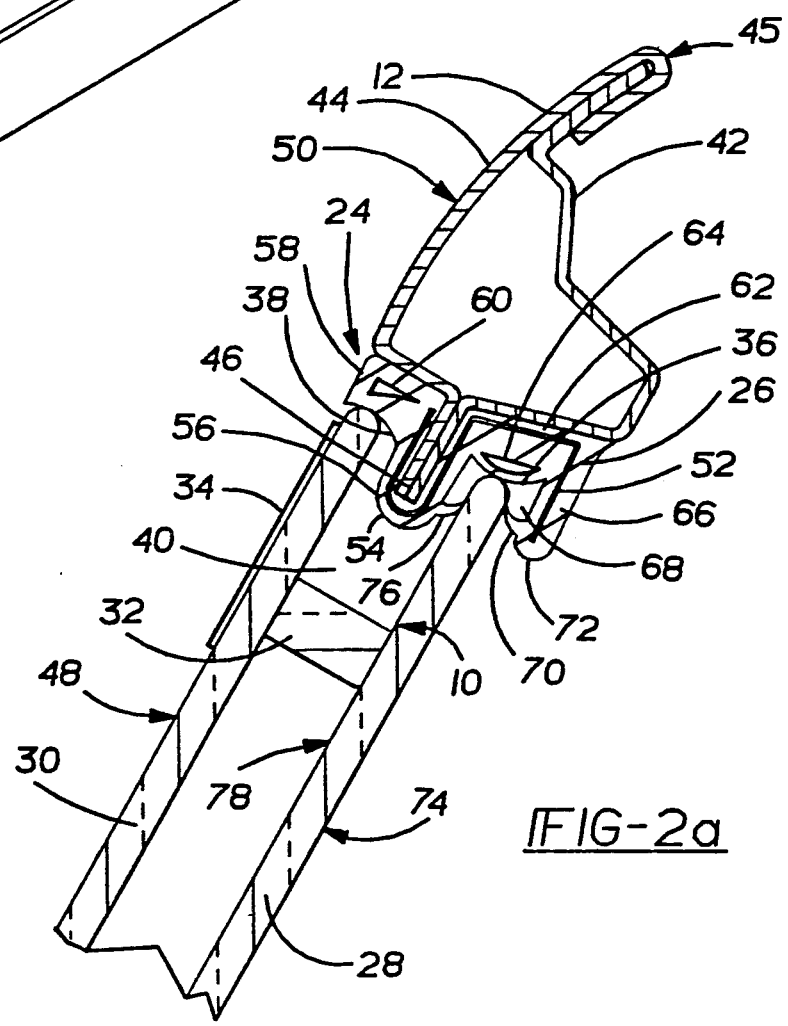
FIG. 2a is a cross-sectional view taken along line 2—2 of FIG. 1 showing the sealing system of the present invention as installed with the vehicle door.

The sealing system of the present invention is illustrated in the three preferred embodiments shown in the accompanying drawings. Each of the embodiments of FIGS. 2a, 2b and 2c are suited for use with a vertically movable dual pane window assembly, indicated generally at 10 in FIG. 1, operatively carried in an automotive vehicle door 12. As is customary, the window 10 is vertically movable between the upward closed position shown to a downward open position in which all or substantially all of the window 10 is concealed within the door 12. Mechanisms for effecting and controlling such movement are well known in the automotive body arts and no specific description of them is deemed necessary. For the purposes of this invention, it should be understood that the door 12 is a hollow structure formed by the joining of shaped inner and outer panels pierced by a window aperture, indicated at 14, to be closed by the window 10. In the door 12, as illustrated in FIG. 1, the lower edge 16 of the aperture 14 is open to receive the vertically movable window 10 and rear, top and side edges 18, 20, 22, respectively are preferably constructed according to FIGS. 2a, 2b or 2c to form the sealing system of the present invention to create a reliable and effective fluid seal between the window 10 and the adjacent body panels forming the door 12.

Turning now to FIG. 2a, one preferred embodiment of the sealing system of the present invention is illustrated generally at 24 as comprising a seal member 26 engaged between the window 10 and the door 12. The seal 26 is configured to efficiently and effectively cooperate with the window 10 and the door 12 when these components are constructed as shown in the drawings. The window 10 may be of the type disclosed in the above-mentioned patents to Mesnel et al. but necessarily comprises inner and outer panes 28, 30, respectively, which are held in fixed substantially parallel relationship by a spacer as indicated at 32. The spacer 32 may be adhesively secured between the panes 28, 30 or purely mechanical fastening and spacing means may be employed. The panes 28, 30 may be fabricated from any transparent or translucent material, such as glass or many of the plastics, and the two panes 28, 30 need not be of the same material. Furthermore, it will become apparent as the description progresses that the sealing system of the present invention may be employed with other types of closure panels, even opaque closure panels, which have the geometric configuration of the window 10 and that the description of the use of the sealing system of the present invention with the glass window pane is not intended to be limiting in any way Where the panes 28, 30 are formed of transparent material, the spacer 32 may be concealed by an opaque covering such as indicated at 34, generally extending peripherally about the window 10. The spacer 32 may likewise be a continuous member running peripherally about the rear, top and front edges 18, 20, 22, respectively, of the window aperture 14 spaced, inwardly from the outer peripheral edges 36, 38 of the inner and outer panes 28, 30, respectively, to define a channel 40 between the panes 28, 30.

The door 12 is illustrated as being constructed in conventional fashion of inner and outer panels 42, 44, respectively, which are joined together at their outer surfaces by a hem flange 45 and also by a internal pinch weld flange 46 which projects inwardly into the window aperture 14 and extends peripherally therearound along the rear top and front edges 18, 20, 22, respectively. The window 10 is positioned so that the pinch weld flange 46 is received within the channel 40 and the outer non-peripheral surface 48 of the outer pane 30 may be arranged in substantially coplanar fashion with outer surfaces, such as that indicated at 50 of outer panel 44. This effects the desirable flush appearance for the exterior of an automotive vehicle door 12; and the seal 26 is configured to be sealingly engaged between the window 10 and the door 12 in a manner consistent with a desire for flushness without the need to effect sealing contact with the window 10 on the outer surface 48 of outer pane 30.

The seal 26 is peripherally formed as an integral member of suitably flexible seal material, such as a natural or synthetic elastomer, and may be fabricated by coextrusion with a metallic stiffener, such as indicated at 52. The seal 26 essentially includes a mounting portion 54 having a slit or opening 56 for receiving the pinch weld flange 46. An outer bulb portion 58 extends from the mounting portion 54 and includes a cavity 60 running coextensive with the strip for increasing the compliance of the bulb portion 58 for effecting compressive sealing engagement with the outer peripheral edges 38 of the outer pane 30. A similarly configured inner bulb portion 62, having a cavity 64 is arranged on the other side of the mounting portion 54. An inner rib 66 is arranged in substantially parallel fashion with the mounting portion 54 to define a U-channel 68 for receiving the inner pane 28. A lip seal portion 70 extends from the free end 72 of the inner leg 66 to sealingly engage the outer surface 74 of the inner pane 28, and a similar lip seal portion 76 extends from the free end of the mounting portion 44 to sealingly engage the outer non-peripheral surface 78 of the inner pane 28. Thus, according to the embodiment shown in FIG. 2a for the sealing system of the present invention, in the closed position of the window 10, sealing engagement with the outer peripheral edges 36, 38 of the inner and outer panes 28, 30, respectively, is effected by the inner and outer bulb portions 62, 58, respectively, of the seal 26 while further sealing contact is made on the inner and outer non-peripheral surfaces 74, 78 of the inner pane 28 by lip seal portion 70, 76, respectively Turning next to FIG. 2b, an alternative embodiment indicated generally at 24b of the sealing system of the present invention is illustrated in which the pinch weld flange 46b is positioned inwardly with respect to the window 10. In this embodiment, the seal member 26b comprises a mounting portion 54b receiving the pinch weld flange 46b and forming an outer leg of a U-channel, which includes a bulb portion 62b and whose other leg comprises a sealing rib 80. An outer bulb portion 58b cooperates with the outer pane 30 essentially identically as the outer bulb portion 58 of FIG. 2a, as does the inner bulb portion 62b with respect to the inner bulb pane 28. Lip seal portions 70b and 76b, likewise duplicate the functions of their numerical counterparts with respect to the inner pane 28. A third lip seal member 82, however, is extended from the sealing rib 80 to sealingly engage the inner non-peripheral surface 84 of the outer pane 30.

Turning lastly to FIG. 2c, another alternative embodiment indicated generally at 24c of the seal assembly of the present invention is illustrated in which a door 12c is formed of known three-piece construction in which a structural U-channel 86 is weldably secured between inner and outer panels 42c, 44c, respectively The seal member 26c cooperates with this modified door construction to provide a second mounting portion 88 which receives an inner pinch weld flange 90 while an inner mounting portion 92 is provided for receiving the inner pinch weld flange 94. The inner and outer mounting portions 88, 92 are joined by an inner bulb portion 62c for compressively sealingly engaging the outer peripheral edge 36 of the inner pane 28 and lip seal portions 70c, 76c extend from the mounting portions 88, 92, respectively, to sealingly engage the non-peripheral surfaces 74, 78 of the inner pane 28. Another lip seal portion 82c projects from the outer mounting portion 92 to sealingly engage the inner non-peripheral face 84 of the outer pane 30, and an outer bulb portion 58c is compressively sealingly engaged by the peripheral edge 38 of the outer pane 30. In addition to the efficient provision of the multiple sealing surfaces described in this third alternative embodiment, the positioning of the inner pane 28 between the sides of the U-channel 86 of the door 12c provides the additional advantage of structurally reinforcing the window 10 against lateral movement.

While only certain embodiments of the sealing system of the present invention have been described, others may be possible without departing from the scope of the appended claims.

I claim:

1. A sealing system a pair of closure panels arranged as inner and outer panels fixed in relationship to each other and slidingly movable in spaced relationship between open and closed positions with respect to an aperture formed through walls of a vehicle body and wherein the outer panel is arranged flush with an outer surface of the vehicle body walls, the system comprising:

at least one peripherally extending flange projecting inwardly from the walls with respect to said aperture; and a seal member operatively disposed between said automotive vehicle body and said panels and including:

a mounting portion receiving said flange for support thereon;

a plurality of lip seal portions sealingly engageable with non-peripheral faces of said panels; and means defining bulb portions compressively sealing engageable with peripheral edges of each of said panels, one of said bulb portions defining the outer end of the seal member and being substantially flush with the outer of said panels.

2. A sealing system as defined in claim 1, wherein the seal member further includes a U-shaped channel portion, one of said bulb portions being positioned in said U-shaped channel portion.

3. A sealing system as defined in claim 1, wherein said lip seal portions sealingly engage inner and outer non-peripheral faces of the inner of said panels.

4. A sealing system as defined in claim 3, wherein said lip portions further sealingly engage the inner non-peripheral face of the outer of said panels.

* * * * *